United States Patent
Lee et al.

(10) Patent No.: US 10,253,867 B2
(45) Date of Patent: Apr. 9, 2019

(54) TIMING BELT COVER ASSEMBLY FOR VEHICLE

(71) Applicants: HYUNDAI MOTOR COMPANY, Seoul (KR); KIA MOTORS CORPORATION, Seoul (KR)

(72) Inventors: Jae Kyun Lee, Seoul (KR); Jae Kyu Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 233 days.

(21) Appl. No.: 15/340,794

(22) Filed: Nov. 1, 2016

(65) Prior Publication Data
US 2017/0292601 A1  Oct. 12, 2017

(30) Foreign Application Priority Data
Apr. 8, 2016 (KR) .................. 10-2016-0043182

(51) Int. Cl.
*F02B 67/06* (2006.01)
*F16H 57/035* (2012.01)

(52) U.S. Cl.
CPC ........... *F16H 57/035* (2013.01); *F02B 67/06* (2013.01)

(58) Field of Classification Search
CPC ............... F16H 757/035; F16H 57/031; F16H 2057/02043; D05B 83/00; F02B 61/02
USPC ......................................................... 474/144
See application file for complete search history.

(56) References Cited

U.S. PATENT DOCUMENTS

| | | | | |
|---|---|---|---|---|
| 461,497 | A * | 10/1891 | Dobeck .................. | D05B 83/00 112/261 |
| 856,779 | A * | 6/1907 | Heller et al. ........... | D05B 83/00 112/261 |
| 1,282,376 | A * | 10/1918 | Cabelinsky ............ | D05B 83/00 112/261 |
| 1,722,078 | A * | 7/1929 | Dreyer ................... | D05B 83/00 112/261 |
| 2,168,501 | A * | 8/1939 | Stoyanowski ......... | D05B 83/00 112/261 |
| 2,295,582 | A * | 9/1942 | Ingwer ................... | D05B 83/00 112/261 |
| 4,723,619 | A * | 2/1988 | Yamamoto ............... | B62M 7/06 180/219 |
| 4,869,708 | A * | 9/1989 | Hoffmann ................. | F01L 1/02 474/140 |
| 4,950,210 | A * | 8/1990 | Kawauchi ............. | F02F 7/0065 280/159 |
| 6,338,688 | B1 * | 1/2002 | Minami ................ | F16H 57/029 474/144 |

(Continued)

FOREIGN PATENT DOCUMENTS

JP    S61179351 U    11/1986
JP    S62184149 U    11/1987

(Continued)

*Primary Examiner* — Henry Y Liu
(74) *Attorney, Agent, or Firm* — Brinks Gilson & Lione

(57) ABSTRACT

The present disclosure provides a timing belt cover assembly for a vehicle capable of being mounted in a compact structure at a front side of an engine. The timing belt cover assembly includes: a timing belt cover installed at a front side of an engine and having an opening formed in a portion of a front surface thereof; and a support bracket installed to close the opening of the timing belt cover.

5 Claims, 7 Drawing Sheets

(56) References Cited

U.S. PATENT DOCUMENTS

| | | | | |
|---|---|---|---|---|
| 6,544,134 | B2 * | 4/2003 | Ohyama | B62M 7/12 |
| | | | | 474/144 |
| 6,702,298 | B2 * | 3/2004 | Shibata | F16J 15/061 |
| | | | | 277/628 |
| 7,281,596 | B2 * | 10/2007 | Fukuda | F16H 57/0415 |
| | | | | 180/376 |
| 7,303,495 | B2 * | 12/2007 | Schoenek | F16C 35/067 |
| | | | | 384/542 |
| 7,350,439 | B2 * | 4/2008 | Schoenek | B62J 13/00 |
| | | | | 74/606 R |
| 7,951,031 | B2 * | 5/2011 | Hioki | B62J 13/04 |
| | | | | 123/198 E |
| 8,840,496 | B2 * | 9/2014 | Yamanishi | B60K 11/08 |
| | | | | 180/68.1 |
| 9,156,512 | B2 * | 10/2015 | Ono | F02B 61/02 |
| 9,182,031 | B2 * | 11/2015 | Kouma | F16H 57/035 |
| 9,453,573 | B2 * | 9/2016 | Renner | F16H 57/0489 |

FOREIGN PATENT DOCUMENTS

| | | |
|---|---|---|
| JP | H05011324 Y | 9/1988 |
| JP | 2575774 Y | 12/1993 |
| JP | 2545119 Y | 5/1997 |
| KR | 20-1992-0006072 Y | 5/1990 |
| KR | 920006072 Y1 | 8/1992 |
| KR | 20-0131766 Y | 9/1998 |
| KR | 20-0155321 Y | 6/1999 |

* cited by examiner

TIMING BELT COVER ASSEMBLY FOR VEHICLE

CROSS-REFERENCE TO RELATED APPLICATION

This application claims priority to and the benefit of Korean Patent Application No. 10-2016-0043182, filed on Apr. 8, 2016, the entire contents of which is incorporated herein by reference in its entirety.

FIELD

The present disclosure relates to a timing belt cover device for a vehicle, and more particularly, to a timing belt cover assembly for a vehicle capable of being mounted in a compact structure at a front side of an engine.

BACKGROUND

The statements in this section merely provide background information related to the present disclosure and may not constitute prior art.

Generally, a number of pulleys having various functions are installed at a front side of an engine of a vehicle. These pulleys may include a crank pulley fixed to a crank shaft, a pulley of an alternator for supplying power to a vehicle, a pulley of a water pump mounted in order to aid in cooling an engine that is heated, and the like. In most cases, these pulleys are connected to each other by a timing belt.

A timing belt cover that may block foreign materials from being introduced into the timing belt and the pulleys may be installed at a front portion of the engine. In addition, a support bracket for mounting an engine mount may be installed at a front side of the timing belt cover.

The timing belt cover may be formed of a plastic material, the support bracket may be formed of a metal material such as aluminum, or the like. We have found that interference (or thermal interference), or the like, may occur between the timing belt cover and the support bracket, and we have found that the timing belt cover and the support bracket may be spaced apart from each other by a predetermined gap (approximately 10 mm or more) in order to avoid the interference.

However, we have also discovered that due to the spacing between the timing belt cover and the support bracket, sealing performance for the timing belt, or the like, may be deteriorated.

In addition, an entire length of the engine may be increased due to the spacing between the timing belt cover and the support bracket, and it is difficult to secure a space in which the engine is to be installed within a vehicle body due to the increase in the length of the engine described above.

Further areas of applicability will become apparent from the description provided herein. It should be understood that the description and specific examples are intended for purposes of illustration only and are not intended to limit the scope of the present disclosure.

SUMMARY

The present disclosure provides a timing belt cover assembly for a vehicle capable of being mounted compactly at a front portion of an engine, preventing an entire length of the engine from being increased, and improving sealing performance of a timing belt cover by mounting the timing belt cover and a support bracket at a front side of the engine so as to adhere closely to each other.

According to one form of the present disclosure, a timing belt cover assembly includes: a timing belt cover installed at a front side of an engine and having an opening formed in a portion of a front surface thereof; and a support bracket installed to close the opening of the timing belt cover.

A first sealing line may be formed at an edge of at least a portion of a back surface of the opening and a second sealing line may be formed at an edge of at least a portion of the support bracket, and the first sealing line and the second sealing line may adhere closely to each other when the support bracket is installed at the opening of the timing belt cover.

A plurality of reinforcing ribs may be formed on the back surface of the support bracket, and the second sealing lines may be formed at some of the plurality of reinforcing ribs.

The timing belt cover may be divided into a first cover and a second cover, and the opening may be formed in a portion in which the first cover and the second cover are adjacent to each other.

The opening may be formed in an upper portion of the first cover, and face a lower portion of the second cover.

A fitting protrusion may be formed on a lower end surface of the second cover, and a fitting groove into which the fitting protrusion is fitted may be formed in an upper end surface of the support bracket.

The fitting protrusion and the fitting groove may be extended straightly.

A reinforcing part may be bent and formed at an upper end of the fitting protrusion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
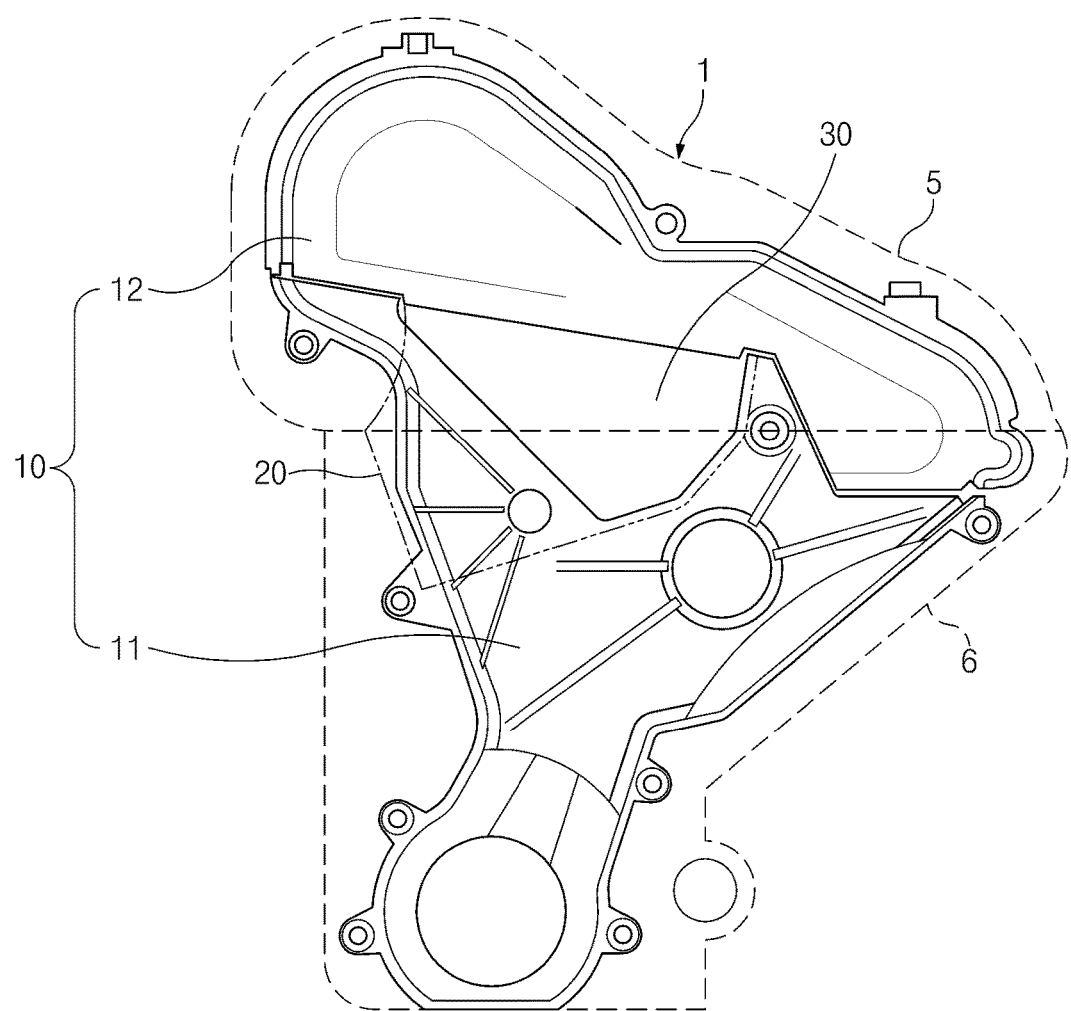
FIG. 1 is a front view illustrating a timing belt cover assembly according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the accompanying drawings. For reference, sizes of components, thicknesses of lines, and the like, illustrated in the accompanying drawings referred to in describing the present disclosure may be exaggerated for convenience of the understanding Referring to FIG. 1, a timing belt cover assembly for a vehicle according to various forms of the present disclosure may include a timing belt cover 10 installed at a front side of an engine 1 and a support bracket 20 installed to adhere closely to the timing belt cover 10.

A a crank pulley fixed to a crank shaft, a pulley of an alternator supplying power to a vehicle, a pulley of a water pump mounted in order to aid in cooling an engine that is heated, and the like, are installed at the front side of the engine 1. These pulleys may be connected to each other by a timing belt so as to interwork with each other.

The timing belt cover 10 is installed at the front side of the engine 1, such that the timing belt cover 10 may prevent external foreign materials from being introduced into the timing belt, the pulleys, and the like. Particularly, the timing belt cover 10 may be installed at a cylinder block 6 and a cylinder head 5 of the engine 1 while securing sealability.

According to various forms of the present disclosure, the timing belt cover 10 may be installed at the front side of the engine 1 so as to be divided into a first cover 11 and a second cover 12.

The first cover 11 may be installed at the cylinder block 6 of the engine 1 through various fasteners, or the like. Particularly, an edge of the first cover 11 may be installed to adhere closely to the cylinder block 6 to secure sealability.

The second cover 12 may be installed at the cylinder head 5 of the engine 1 through various fasteners. Particularly, an edge of the second cover 12 may be installed to adhere closely to the cylinder head 5 to secure sealability.

In addition, an opening 30 may be formed in a portion of a front surface of the timing belt cover 10, and a sealing mounting surface on which the support bracket 20 may be mounted to adhere closely may be secured by the opening 30.

According to various forms of the present disclosure, the opening 30 may be formed in a portion in which the first cover 11 and the second cover 12 are adjacent to each other. Therefore, the support bracket 20 may be installed to close the opening 30, such that the support bracket 20 and the timing belt cover 10 may be installed to very air-tightly adhere closely to each other. Therefore, a gap between the support bracket 20 and the timing belt cover 10 is substantially dose to "0" or non-existent, such that an entire length of the engine 1 may be decreased as compared with the related art. As a result, an engine installation space in a vehicle body may be stably secured.

According to one form, the opening 30 may be formed in an upper portion of the first cover 11 having an area relatively wider than that of the second cover 12. Therefore, the opening 30 may face a lower portion of the second cover 12.

The support bracket 20 may be installed to dose the opening 30 of the timing belt cover 10, and the back surface of the support bracket 20 may be installed to adhere closely to an edge of the opening 30.

Figure 2:
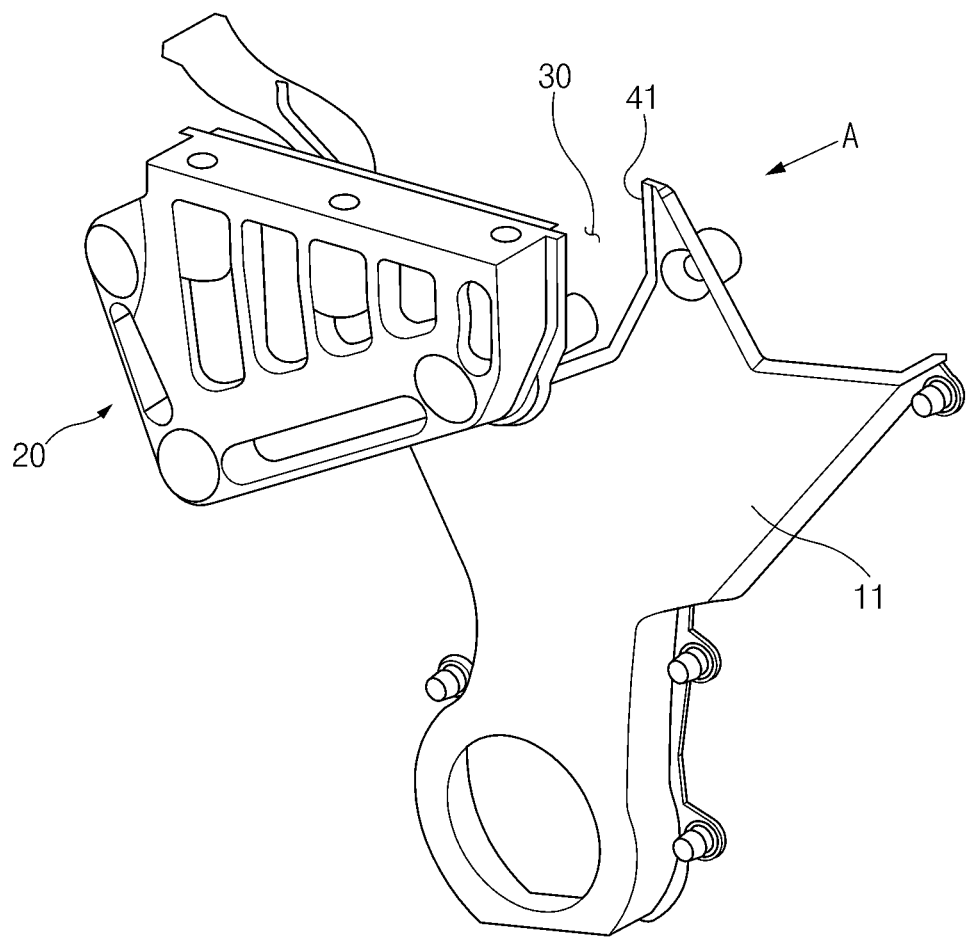
FIG. 2 is a perspective view illustrating a process of assembling a support bracket and a first cover of the timing belt cover assembly according to one form of the present disclosure to each other.
Figure 3:
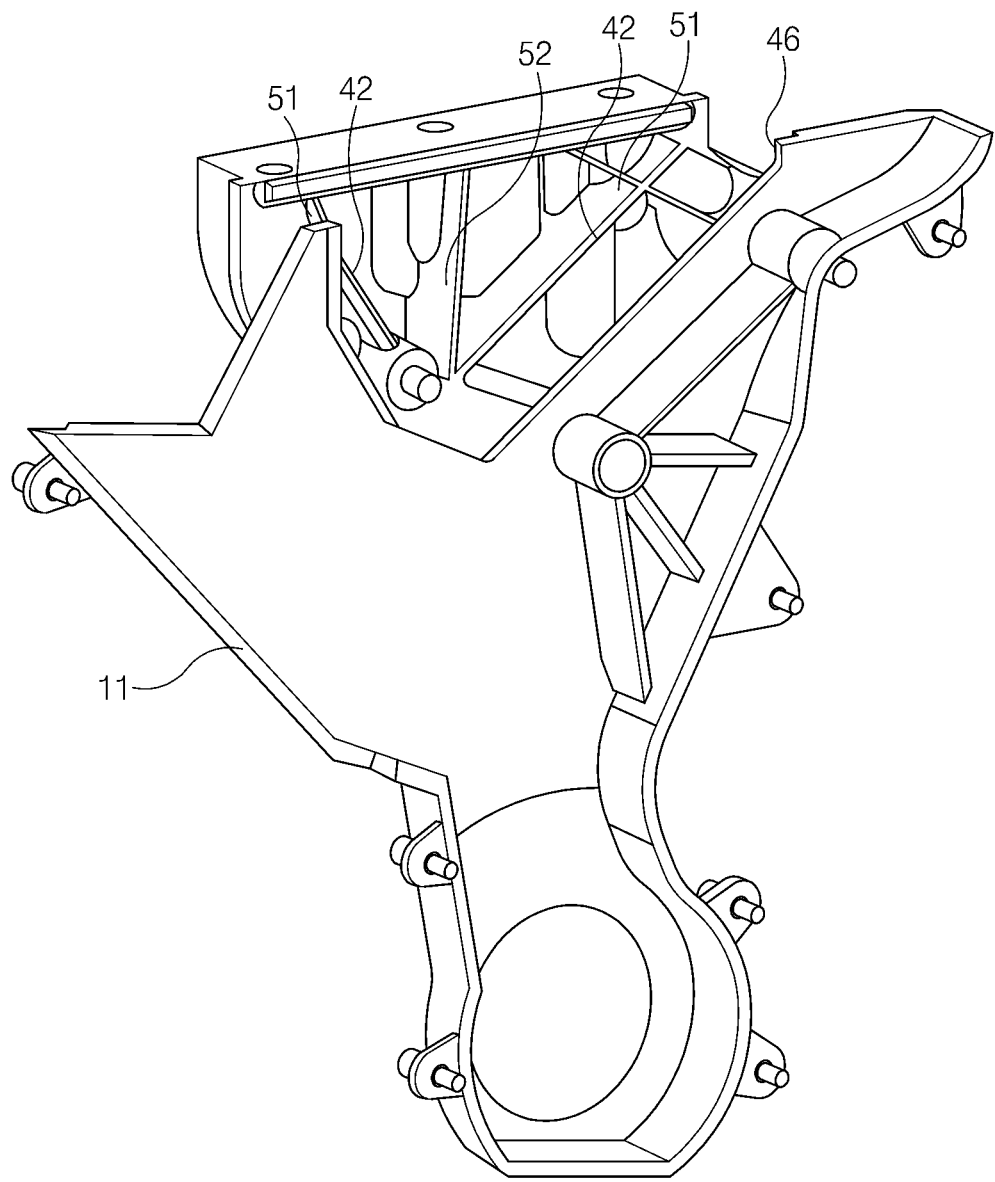
FIG. 3 is a view viewed in an arrow direction A of FIG. 2.
Figure 4:
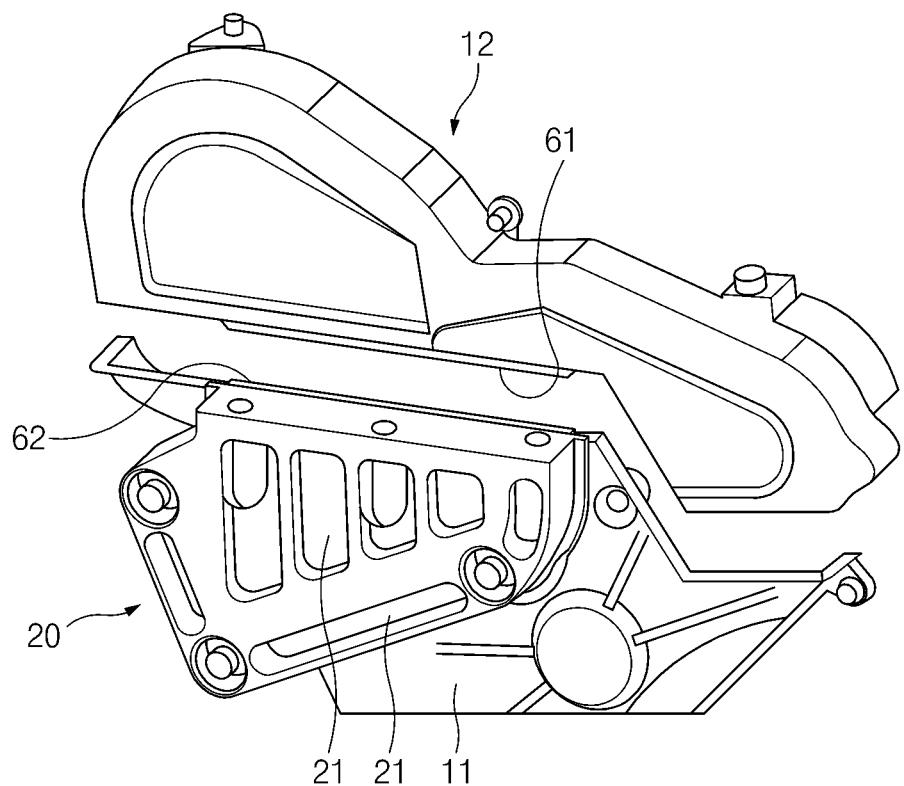
FIG. 4 is a perspective view illustrating a process of assembling a second cover and the support bracket of the timing belt cover assembly according to one form of the present disclosure to each other.
Figure 5:
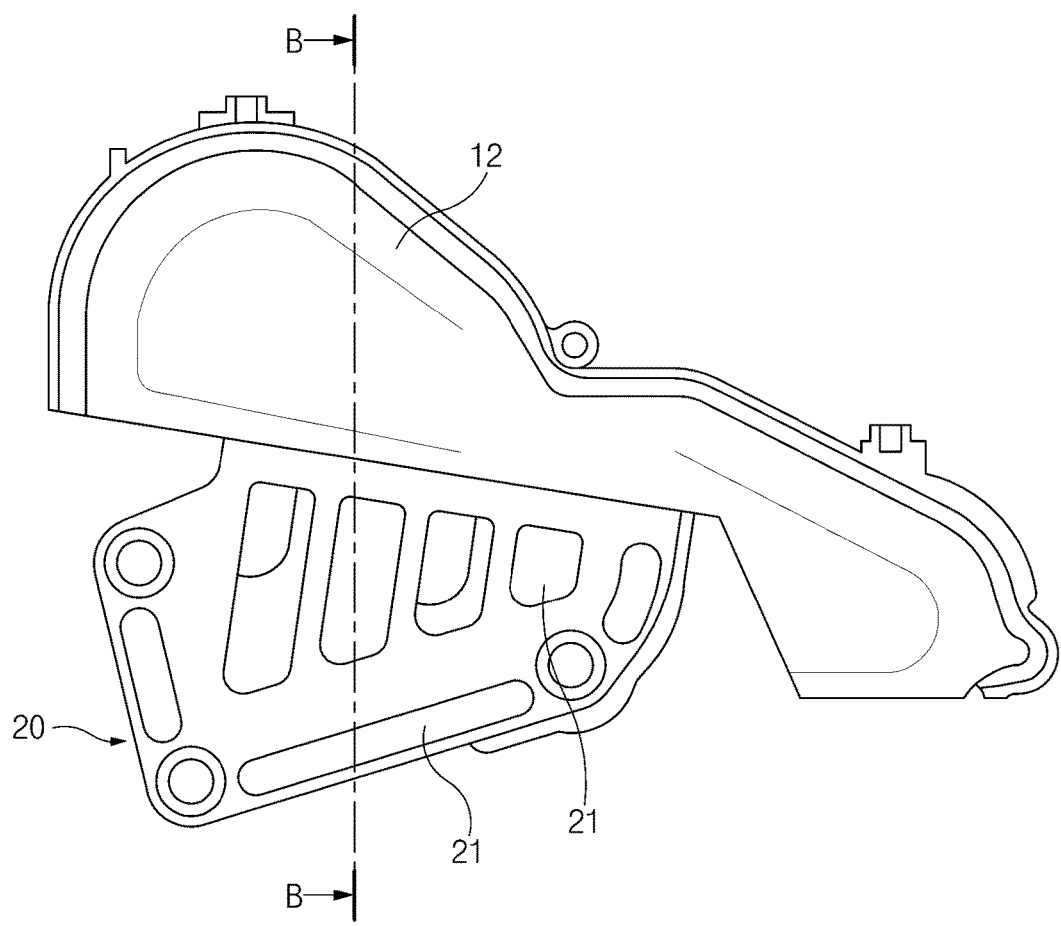
FIG. 5 is a front view illustrating a state in which the second cover and the support bracket of the timing belt cover assembly according to one form of the present disclosure are assembled to each other.
Figure 6:
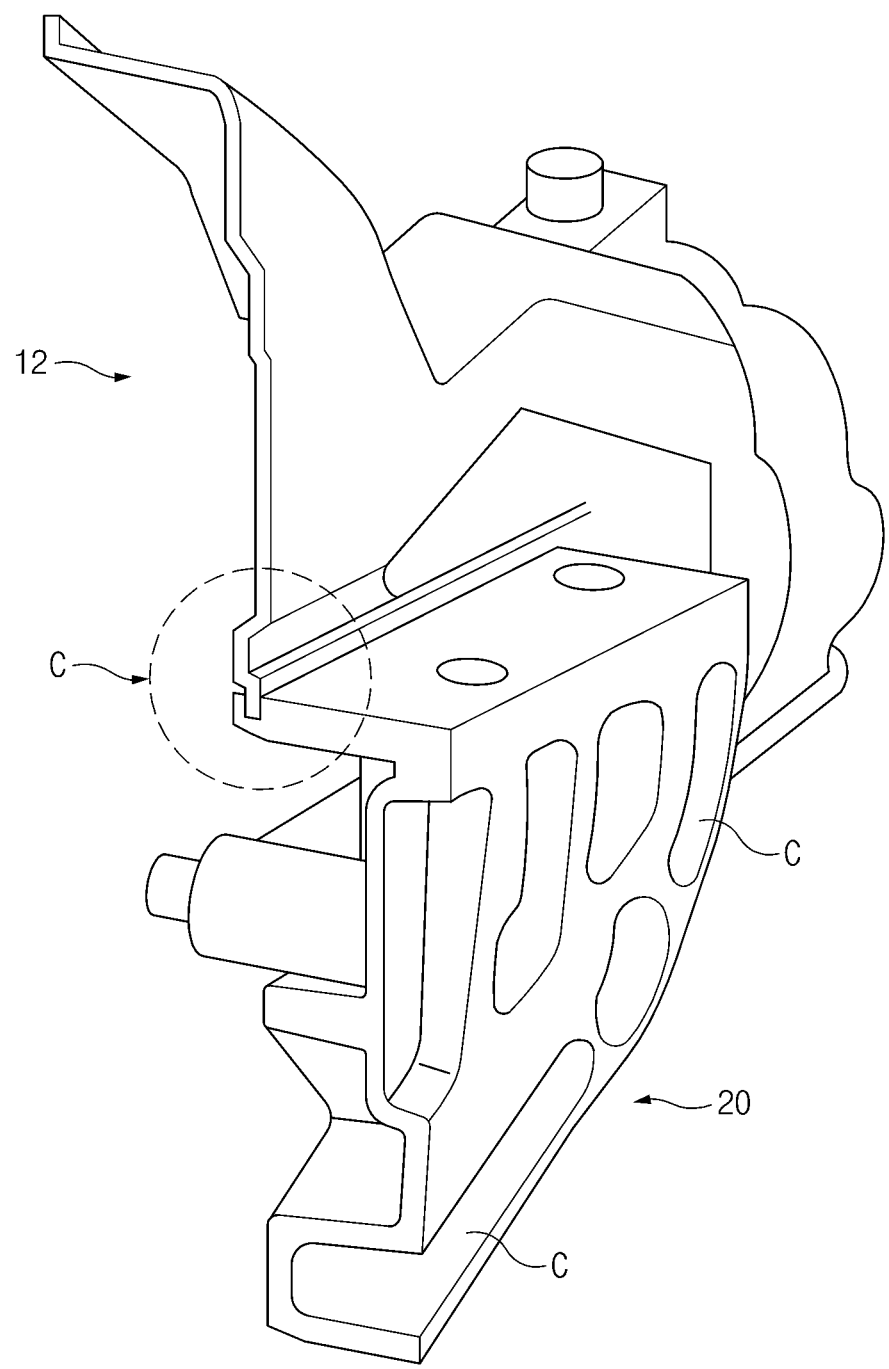
FIG. 6 is a cross-sectional view taken along line B-B of FIG. 5.
Figure 7:
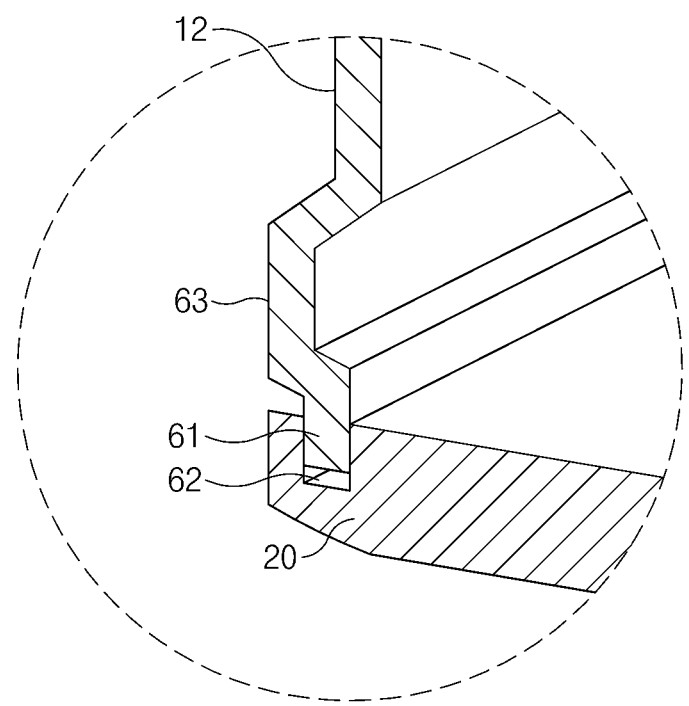
FIG. 7 is a view illustrating an arrow portion C of FIG. 6.

As illustrated in FIGS. 2 and 3, a first sealing line 41 may be formed at an edge of at least a portion of the opening 30, and a second sealing line 42 may be a plurality of second seling lines formed at an edge of at least a portion of the back surface of the support bracket 20. Therefore, when the support bracket 20 is coupled to the cylinder block 6 of the engine 1 so as to dose the opening 30 of the timing belt cover 10, the first sealing line 41 and the second sealing line 42 substantially air-tightly adhere closely to each other, such that the support bracket 20 may substantially air-tightly adhere closely to the timing belt cover 10 while securing sealability for the timing belt cover 10.

Additionally, a packing member such as an O-ring, or the like, may be installed in a length direction (a line direction) at at least any one of the first sealing line 41 and the second sealing line 42, and sealability between the first sealing line 41 and the second sealing line 42 may be significantly improved by the packing member.

Meanwhile, a plurality of reinforcing ribs 51 and 52 may be formed on the other surface of the support bracket 20, and the second sealing lines 42 may be formed at some 51 of the plurality of reinforcing ribs 51 and 52, thereby making it possible to more stably secure sealability between the support bracket 20 and the opening 30.

In addition, the support bracket 20 has one or more embossings 21, and rigidity of the support bracket 20 may be reinforced by the embossings 21.

In addition, in the case in which a shape, a layout, or the like, of the embossings 21 of the support bracket 20 is adjusted, a frequency region of the timing belt cover 10 is changed, thereby making it possible to avoid a frequency region generated in a commercial driving region of the engine. As a result, the timing belt cover 10 and the support bracket 20 may be less affected by a vibration frequency generated in the commercial driving region of the engine, such that a transfer of vibration may be minimized.

Referring to FIGS. 4 to 7, a fitting protrusion 61 may protrude downward and be formed at a lower end of the second cover 12, and a fitting groove 62 into which the fitting protrusion 61 is fitted may be formed in an upper end of the support bracket 20.

As described above, the lower end of the second cover 12 and the upper end of the support bracket 20 may be installed to substantially air-tightly adhere closely to each other by the fitting protrusion 61 and the fitting groove 62. Therefore, a dosing property for the opening 30 of the timing belt cover 10 may be secured, and spacing between the timing belt cover 10 and the support bracket 20 may be certainly prevented.

Particularly, the fitting protrusion 61 and the fitting groove 62 may be extended straightly. Therefore, deformation of the second cover 12 due to pressure of sealing surfaces between the second cover 12 and the support bracket 20 when the second cover 12 and the support bracket 20 adhere closely to each other may be effectively prevented.

In addition, a reinforcing part 63 may be bent and formed at an upper end of the fitting protrusion 61, and deformation of the fitting protrusion 61 and the second cover 12 may be more effectively prevented by the reinforcing part 63.

A process of assembling the timing belt cover assembly according to the present disclosure configured as described above will be described with reference to FIGS. 2 to 7. First, the first cover 11 is installed at the cylinder block 6 of the engine 1. Then, the support bracket 20 is coupled to the cylinder block 6 in a scheme in which it doses the opening 30 of the first cover 11, as illustrated in FIGS. 2 and 3. Therefore, edges of at least portions of the support bracket 20 and the first cover 11 may secure sealability through the first sealing line 41 and the second sealing line 42.

Then, as illustrated in FIGS. 4 to 7, the fitting protrusion 61 of the second cover 12 is fitted into the fitting groove 62 of the support bracket 20, thereby making it possible to secure a substantially air-tight close adhesion property between the second cover 12 and the support bracket 20. Then, the second cover 12 may be installed at the cylinder head 5 of the engine 1.

Meanwhile, the present disclosure is not limited to the process of assembling the timing belt cover assembly described above. That is, the timing belt cover assembly may also be assembled by temporarily coupling the support bracket 20 between the first cover 11 and the second cover 12, installing the first cover 11 and the support bracket 20 at the cylinder block 6, and then installing the second cover 12 at the cylinder head 5.

As described above, according to various forms of the present disclosure, the timing belt cover and the support bracket are mounted at the front side of the engine so as to adhere closely to each other, such that the front portion of the engine may be compactly configured. Therefore, an increase in the entire length of the engine may be prevented, and sealing performance of the timing belt cover may be improved.

In addition, in one form of the present disclosure, the timing belt cover is divided into the first cover and the second cover and is then assembled to the front side of the engine, such that the timing belt cover may be precisely assembled and may be easily disassembled. Therefore, repair, replacement, or the like, of a broken-down timing belt may be very simply performed.

Although the present disclosure has been described with reference to various forms and the accompanying drawings, the present disclosure is not limited thereto, but may be variously modified and altered by those skilled in the art to which the present disclosure pertains without departing from the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A timing belt cover assembly comprising:
    a timing belt cover installed at a front side of an engine and having an opening formed in a portion of a front surface thereof; and
    a support bracket installed to close the opening of the timing belt cover;
    wherein the timing belt cover is divided into a first cover and a second cover, and the opening is formed in a portion in which the first cover and the second cover are adjacent to each other,
    wherein a fitting protrusion is formed on a lower end surface of the second cover, and a fitting groove into which the fitting protrusion is fitted is formed in an upper end surface of the support bracket,
    wherein the fitting protrusion and the fitting groove straightly extend along the lower end surface of the second cover and the upper end surface of the support bracket, respectively, and
    wherein a reinforcing part is bent and formed at an upper end of the fitting protrusion.

2. The timing belt cover assembly according to claim 1, wherein the opening is formed in an upper portion of the first cover, and faces a lower portion of the second cover.

3. The timing belt cover assembly according to claim 1, wherein a first sealing line is formed at an edge of at least a portion of the opening and a second sealing line is formed at an edge of at least a portion of a back surface of the support bracket, and
    the first sealing line and the second sealing line adhere closely to each other when the support bracket is installed at the opening of the timing belt cover.

4. The timing belt cover assembly according to claim 3, wherein a plurality of reinforcing ribs are formed on a back surface of the support bracket, and the second sealing line is a plurality of second sealing lines formed at some of the plurality of reinforcing ribs.

5. A timing belt cover assembly comprising:
    a timing belt cover installed at a front side of an engine and having an opening formed in a portion of a front surface thereof; and
    a support bracket installed to close the opening of the timing belt cover; wherein the timing belt cover is divided into a first cover and a second cover, and the opening is formed in a portion in which the first cover and the second cover are adjacent to each other,
    wherein a first sealing line is formed at an edge of at least a portion of the opening and a second sealing line is formed at an edge of at least a portion of a back surface of the support bracket,
    wherein the first sealing line and the second sealing line adhere closely to each other when the support bracket is installed at the opening of the timing belt cover, and
    wherein a plurality of reinforcing ribs are formed on a back surface of the support bracket, and the second sealing line is a plurality of second sealing lines formed at some of the plurality of reinforcing ribs.

* * * * *